(12) United States Patent
Koorapaty et al.

(10) Patent No.: US 8,654,687 B2
(45) Date of Patent: Feb. 18, 2014

(54) DUAL CHANNEL TIME DIVISION DUPLEX (TDD) COMMUNICATION

(75) Inventors: Havish Koorapaty, Saratoga, CA (US); Jung-Fu Cheng, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 246 days.

(21) Appl. No.: 13/109,524

(22) Filed: May 17, 2011

(65) Prior Publication Data
US 2012/0294203 A1 Nov. 22, 2012

(51) Int. Cl.
*H04L 5/14* (2006.01)
(52) U.S. Cl.
USPC .......................................................... 370/280
(58) Field of Classification Search
USPC .......................................................... 370/280
See application file for complete search history.

(56) References Cited

U.S. PATENT DOCUMENTS

| 7,502,596 | B2 * | 3/2009 | Takao et al. ...................... 455/78 |
| 2008/0279125 | A1 * | 11/2008 | Hottinen ........................ 370/281 |
| 2011/0176435 | A1 * | 7/2011 | Khandekar et al. ............. 370/252 |

FOREIGN PATENT DOCUMENTS

WO    WO 2011/011758 A1    1/2011

* cited by examiner

*Primary Examiner* — Mark Rinehart
*Assistant Examiner* — Maharishi Khirodhar

(57) ABSTRACT

A system and method to use existing Long Term Evolution (LTE) and Worldwide Interoperability for Microwave Access (WiMAX) based signaling to effectuate dual-channel Time Division Duplex (TDD) communication between two transceivers giving preference to one type of subframes (either downlink or uplink) for data transmission. In backhaul communications between pico (or femto) and macro base stations, using LTE and WiMAX's TDD mode in such a manner effectively reduces unnecessary transmissions of pilot and synchronization sequence in downlink signaling, thereby reducing the level of pilot overhead and minimizing interference when data is not being transmitted. Similarly, the use of existing LTE (or WiMAX) implementations of TDD radio frames in this manner may achieve radio silence for some duration (e.g., when no uplink sub-frames are transmitted) when operating in a license-exempt spectrum, thereby allowing other license-exempt devices to potentially share the radio channel during the silence period.

5 Claims, 7 Drawing Sheets

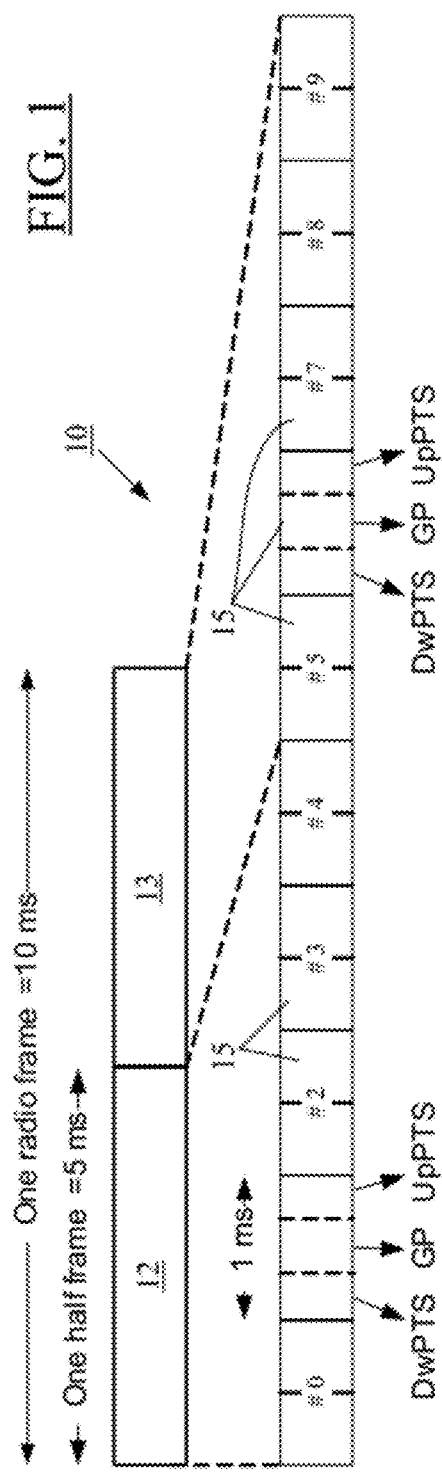

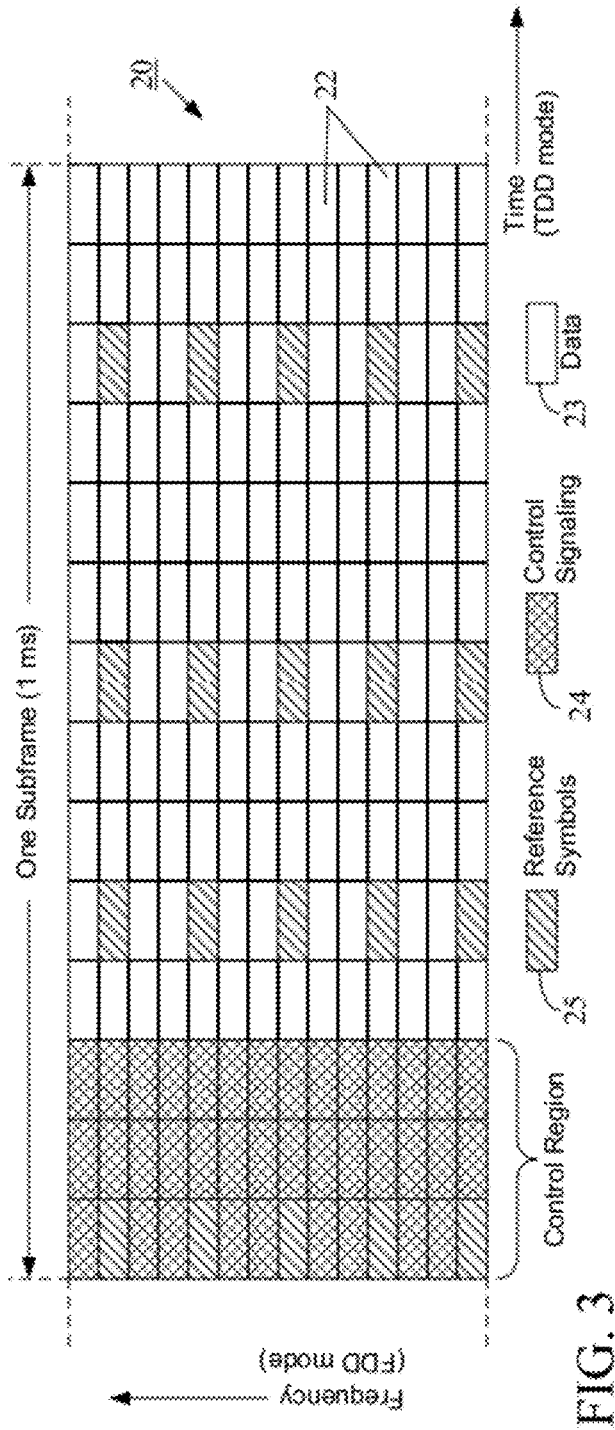
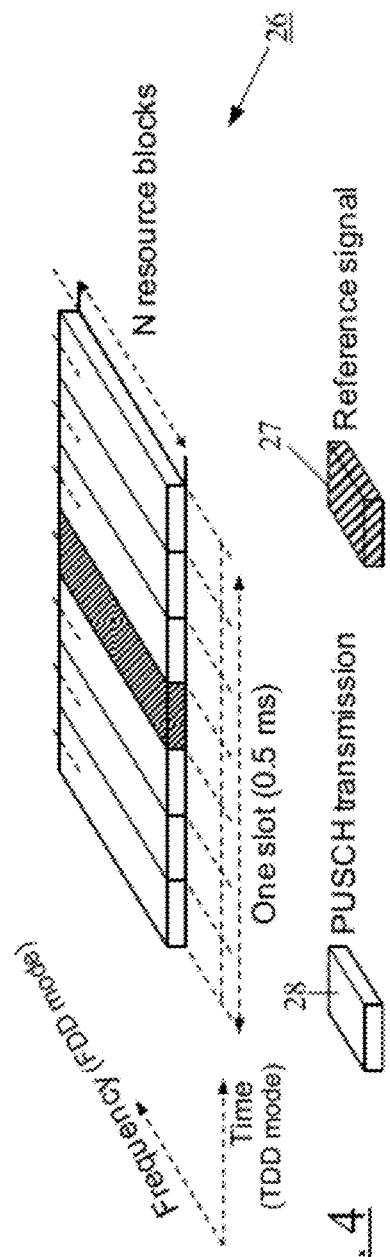
FIG. 3
FIG. 4

DUAL CHANNEL TIME DIVISION DUPLEX (TDD) COMMUNICATION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND

The present invention relates to facilitating wireless communication between two transceivers. More particularly, and not by way of limitation, the present invention is directed to a system and method to modify a Time Division Duplex (TDD) communication mode supported by current Third Generation Partnership Project (3GPP) standards to facilitate wireless communication between pico and macro base stations, and also between two devices operating in license-exempt bands.

The usage of mobile communication, especially over cellular networks, has shown a significant increase during recent years. In parallel to this, there is an ongoing evolution of Third Generation (3G) and Fourth Generation (4G) cellular networks like High Speed Packet Access (HSPA), Long Term Evolution (LTE), Worldwide Interoperability for Microwave Access (WiMAX), etc., to support ever-increasing performance with regards to capacity, peak bit rates and coverage.

It is expected that the 3GPP LTE standard will play a major part in the evolution of wireless networks. Other wireless networks such as WiMAX also will be used in some market segments. Both LTE and WiMAX are currently specified for use in licensed bands and mainly for serving mobile terminals or User Equipments (UE's). However, these LTE and WiMAX standards are being considered for other use cases in the future, e.g., for wireless backhaul communication between a pico (or femto) base station and a macro base station. Similarly, they are also being considered for use in license-exempt bands. Aspects of these standards—such as synchronization sequences and presence of pilot symbols—have been designed to deal with mobility and specific UE-oriented scenarios. However, these aspects are not always well suited for the future use cases (e.g., backhaul communication between pico and macro base stations, or communication between two devices operating in a license-exempt band) being considered. While the LTE specification is evolving and some modifications may be made to the standard to handle these use cases better, it is of significant interest to be able to use LTE and WiMAX as currently defined to the extent possible. Such usage of existing standard in its current form for different applications (e.g., backhaul communication between pico and macro base stations, or communication between two devices operating in a license-exempt band) provides economies of scale and allows products and implementations with lower cost.

Both LTE and WiMAX implement Time Division Duplex (TDD) and Frequency Division Duplex (FDD) modes simultaneously. FIG. 1 shows an LTE radio frame 10 in the TDD mode. The LTE radio frame duration is 10 ms. For TDD mode, the frame consists of two 5 ms half-frames 12-13, each half-frame consisting of five sub-frames 15 as shown in FIG. 1. Each subframe 15 is of 1 ms duration and can be allocated to downlink (DL), uplink (UL) or as a special subframe which consists of the Downlink Pilot Time Slot (DwPTS), Guard Period (GP) and Uplink Pilot Time Slot (UpPTS) fields. There are two such special subframes shown in the radio frame 10 in FIG. 1. The GP field in the special subframe enables switching between downlink and uplink transmissions.

FIG. 2 is a table 18 showing uplink-downlink allocations for various sub-frames in a TDD-LTE radio frame (e.g., the radio frame 10 in FIG. 1). In the table 18, the letter "D" refers to a downlink subframe, the letter "U" refers to an uplink subframe, and the letter "S" refers to a special subframe. The periodicity of the switch-point between downlink and uplink can be 5 ms or 10 ms. As mentioned before, the switching from downlink to uplink transmission, and vice versa, may be accomplished using the special subframe "S." In case of FIG. 1, the radio frame configuration 10 can be a type-2 (from table 18 in FIG. 2) frame structure having 5 ms switch-point periodicity and "DSUDDDSUDD" subframe configuration. Thus, as shown in the table 18, sub-frame allocations can be made in multiple ways in an LTE-TDD radio frame. Various versions of WiMAX standard also have similar TDD frame structures with a 5 ms periodicity.

FIG. 3 illustrates a downlink sub-frame 20 in an LTE radio frame (e.g., the radio frame 10 in FIG. 1). Thus, one or more sub-frames 15 (depending on frame structure selected from the available configurations shown in the table 18 in FIG. 2) in the radio frame 10 in FIG. 1 can have the downlink configuration 20. As shown in FIG. 3, a downlink LTE sub-frame 20 includes a number of resource blocks 22 (in the frequency domain) that can be used to carry different types of information—data 23, control signaling 24, or reference symbols 25. A downlink LTE subframe has a minimum set of reference symbols and control signaling that is required. The reference symbols 25 in the downlink subframe 20 are sent even when there is no data to be sent. In addition to the reference symbols 25 shown in FIG. 3, there are synchronization sequences (e.g., Primary Synchronization Sequence (PSS), and Secondary Synchronization Sequence (SSS)) (not shown) sent once every 5 ms. These sequences (not shown) occupy only a part of the bandwidth (6 resource blocks) at the center of the carrier bandwidth and are also sent independent of any user data transmissions in the subframe.

FIG. 4 illustrates an uplink sub-frame 26 in an LTE radio frame (e.g., the radio frame 10 in FIG. 1). The corresponding uplink transmission may be a Physical Uplink Shared Channel (PUSCH) transmission in LTE. Like the downlink subframe 20, the LTE uplink subframe 26 also has reference symbols 27 and data blocks 28. However, in case of the uplink subframe 26, the reference symbols 27 are only transmitted when there is corresponding data to be sent.

SUMMARY

It is noted here that LTE uplink and downlink subframes are primarily designed to address communication to and from mobile terminals or handsets. However, for the wireless backhaul scenario, nodes (e.g., pico and macro base stations) are not expected to be fully mobile and, hence, the level of pilot overhead (e.g., in downlink signaling) in LTE and WiMAX is inherently wasteful. For the use of LTE and WiMAX to facilitate communication in license-exempt bands, the presence of reference symbols and synchronization symbols in all downlink frames makes it more difficult to share the wireless link in a fair manner with other license-exempt users in the same spectrum. Additionally, when wireless communication is carried out using LTE and WiMAX standards for backhaul and license-exempt applications mentioned before, pilot and synchronization sequence transmissions occur in downlink portions of the radio frame even when no data needs to be sent for these applications. This may cause interference to other radio links or devices in the system.

It is therefore desirable to devise a methodology to enable usage of LTE and WiMAX based signaling in the wireless backhaul applications, while reducing unnecessary pilot and synchronization transmissions. In case of the license-exempt application of LTE and WiMAX standards based signaling, it is desirable to provide the ability to a device operating in the license-exempt band to share the radio channel with another transmitter that may be using the same or a different technology for communication.

Accordingly, particular embodiments of the present invention provide the ability to use existing LTE and WiMAX based signaling in backhaul communications between pico (or femto) and macro base stations using LTE and WiMAX's TDD mode in such a manner as to effectively reduce unnecessary transmissions of pilot and synchronization sequence in downlink signaling, thereby reducing the level of pilot overhead. In case of usage of existing LTE and WiMAX standards in license-exempt applications, the TDD-based communication scheme according to certain embodiments of the present invention enables a device operating in a license-exempt band to share a wireless communication channel with other devices so as to maintain fair-sharing of frequency resources with other devices in the license-exempt spectrum.

In one embodiment, the present invention is directed to a method of wirelessly transmitting data from a first transceiver to a second transceiver. The method comprises: establishing a first Time Division Duplex (TDD) connection between the first and second transceivers on a first carrier frequency; establishing a second TDD connection between the first and second transceivers on a second carrier frequency; selecting by the first transceiver, subframes from at least one set of subframes for transmitting the data to the second transceiver during a single radio frame duration, wherein the subframes are selected from: a first set of subframes in the first TDD connection, wherein the first set of subframes is designated for downlink transmission in the first TDD connection, and a second set of subframes in the second TDD connection, wherein the second set of subframes is designated for uplink transmission in the second TDD connection; and transmitting the data from the first transceiver to the second transceiver utilizing the selected subframes.

In one embodiment, the present invention is directed to a first transceiver in a system wherein the first transceiver is in wireless communication with a second transceiver. The first transceiver comprises: a transmitter unit to transmit data to the second transceiver; and a processor coupled to the transmitter unit to cause the transmitter unit to send the data to the second transceiver using at least one of: downlink transmission-related subframes in a first TDD connection established between the first and the second transceivers on a first carrier frequency, and uplink transmission-related subframes in a second TDD connection established between the first and the second transceivers on a second carrier frequency.

In another embodiment, the present invention is directed to a system comprising a first transceiver; and a second transceiver that is in wireless communication with the first transceiver. In the system, the first transceiver is configured to transmit data to the second transceiver using at least one of: downlink subframes in a first TDD connection established between the first and the second transceivers on a first carrier frequency, and uplink subframes in a second TDD connection established between the first and the second transceivers on a second carrier frequency.

Thus particular embodiments of the present invention support dual-channel based TDD communication using downlink (or uplink) subframe-selective transmissions, while using existing LTE/WiMAX implementations of TDD to minimize interference when data is not being transmitted, thus improving system performance for applications such as wireless backhaul. When downlink subframes are preferred for data transmission, the issue of transmission of reference symbols and pilot/synchronization sequences in empty LTE downlink subframes without accompanying data may not arise. Furthermore, when data is not transmitted using uplink subframes, the reference symbols in LTE uplink subframes are not sent as well, thereby significantly reducing interference and unnecessary transmissions in the system. In particular embodiments, the use of existing LTE (or WiMAX) implementations of TDD radio frames to achieve radio silence for some duration (e.g., when no uplink sub-frames are transmitted) when operating in a license-exempt spectrum allows other license-exempt devices to potentially share the radio channel during the silence period.

BRIEF DESCRIPTION OF THE DRAWINGS

In the following section, the invention will be described with reference to exemplary embodiments illustrated in the figures, in which:

FIG. 1 shows an LTE radio frame in the TDD mode;

FIG. 2 is a table showing uplink-downlink allocations for various sub-frames in a TDD-LTE radio frame;

FIG. 3 illustrates a downlink sub-frame in an LTE radio frame;

FIG. 4 illustrates an uplink sub-frame in an LTE radio frame;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of an LTE or WiMAX based wireless network, the invention can be implemented in other forms of synchronized TDD-based wireless systems or networks as well (for example, a corporate-wide wireless data network, a residential wireless network, etc.).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "sub-frame") may be occasionally interchangeably used with its non-hyphenated version (e.g., "subframe"). Such occasional interchangeable uses shall not be considered inconsistent with each other.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

Before discussing dual channel TDD communication with reference to FIGS. 7 through 11 according to the teachings of the present invention, a brief discussion of exemplary wireless systems or configurations in which the teachings of the present invention may be used is provided below with reference to FIGS. 5 and 6.

Figure 5:
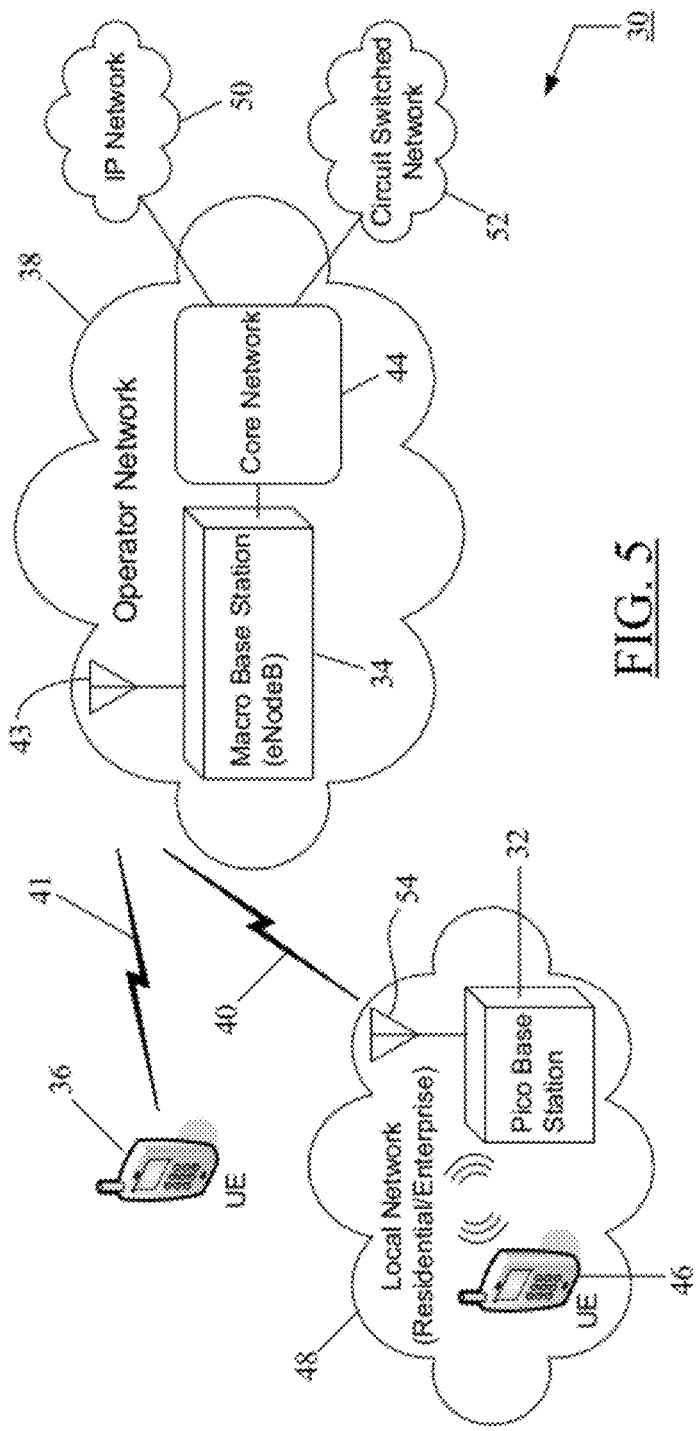
FIG. 5 is a diagram of an exemplary backhaul wireless communication system in which the teachings of one embodiment of the present invention may be implemented.

FIG. 5 is a diagram of an exemplary backhaul wireless communication system 30 in which the teachings of one embodiment of the present invention may be implemented. The system 30 may include a pico (or femto or other smaller) base station 32 in backhaul wireless communication (discussed below) with a macro base station (or communication node) 34. The system 30 may further include a mobile handset 36 that is in wireless communication with an operator network 38 of a wireless service provider (or operator) through the macro base station 34 of the operator network 38. The macro base station 34 may be, for example, a base station in a 3G network, or an evolved Node-B (eNodeB) or Home eNodeB (HeNB) when the carrier network is a Long-Term Evolution (LTE) network, or any other home base station, and may provide radio interface to the mobile handset 36 and the pico base station 32. In other embodiments, the macro base station 34 may also include a site controller, an access point (AP), or any other type of radio interface device capable of operating in a wireless environment. It is noted here that the terms "mobile handset," "wireless handset," and "user equipment (UE)" may be used interchangeably herein to refer to a wireless communication device that is capable of voice and/or data communication via a wireless carrier network (e.g., the network 38). Some examples of such mobile handsets include cellular telephones or data transfer equipments (e.g., a Personal Digital Assistant (PDA) or a pager), smartphones (e.g., iPhone™, Android™, Blackberry™, etc.), computers, or any other type of user devices capable of operating in a wireless environment. Similarly, the terms "operator network" or "carrier network" may be used interchangeably herein to refer to a wireless communication network (e.g., a cellular network) facilitating voice and/or data communication between two user equipments (UE's) operating in a licensed spectrum (as opposed to the license-exempt band or spectrum discussed with reference to FIG. 6 below).

In addition to providing air interface (e.g., as represented by wireless links 40, 41 in FIG. 5) to the UE 36 and the pico base station 32 via an antenna 43, the macro base station 34 may also perform radio resource management (as, for example, in case of an eNodeB or HeNB in an LTE system) via scheduling of downlink (DL) and uplink (UL) communication to and from the UE 36 and the pico base station 32. In case of a 3G carrier network 38, the macro base station 34 may include functionalities of a 3G base station along with some or all functionalities of a 3G Radio Network Controller (RNC) to perform the dual channel TDD communication discussed below. Communication nodes or macro base stations in other types of carrier networks (e.g., 4G networks and beyond) also may be configured similarly.

The operator network 38 may include a core network 44 coupled to the macro base station 34 and providing logical and control functions (e.g., subscriber account management, billing, subscriber mobility management, etc.) in the network 38. In one embodiment, the base station 34 may be connected to the core network 44 via a suitable gateway (not shown). In case of an LTE carrier network, the core network 44 may be an Access Gateway (AGW). Regardless of the type of carrier network 38, the core network 44 may function to provide connection of the UE 36 to other mobile handsets operating in the carrier network 38 or other connected networks (e.g., the UE 46 operating in a local network 48 discussed below) and also to other communication devices (e.g., wireline phones) or resources (e.g., an Internet website) in other voice and/or data networks external to the operator network 38. In that regard, the core network 44 may be coupled to a packet-switched network 50 (e.g., an Internet Protocol (IP) network such as the Internet) as well as a circuit-switched network 52 such as the Public-Switched Telephone Network (PSTN) to accomplish the desired connections beyond the devices operating in or through the carrier network 38. Thus, through the base station's 34 connection to the core network 44 and the handset's 36 radio link with the base station 34, a user of the handset 36 may wirelessly (and seamlessly) access many different resources or systems beyond those operating within the carrier network 38 of an operator.

As is understood, the operator network 38 may be a cellular telephone network in which the UE 36 may be a subscriber unit. However, the present invention is operable in other noncellular wireless networks as well (whether voice networks, data networks, or both). Furthermore, portions of the operator network 38 may include, independently or in combination, any of the present or future wireline or wireless communication networks such as, for example, the PSTN, or a satellite-based communication link. Similarly, as also mentioned above, the operator network 38 may be connected to the Internet via its core network's 44 connection to the IP (packet-switched) network 50 or may include a portion of the Internet as part thereof.

In FIG. 5, the pico base station 32 may also include an antenna 54 allowing it to communicate with the macro base station 34 via the radio link 40. The pico (or femto) base station may manage various wireless devices (e.g., Bluetooth devices, walkie-talkies, laptop computers, cordless phones, or other short-range wireless communication devices) operating in the local wireless network 48, which could be a home or residence-based wireless network or an enterprise network (e.g., at a corporate headquarter, corporate warehouse, or corporate data processing center). In one embodiment, the pico base station 32 may be situated outdoors. Furthermore, in one embodiment, using the teachings of the present invention, the pico base station 32 may communicate with the UE 46 (or other UEs associated with the operator network 38) over the same existing air interface (e.g., LTE, WiMAX, etc.) as that used for the macro network (i.e., by the macro base station 34). The pico base station 32 may not only provide interconnectivity among various short-range wireless devices (not shown) operating in the local network 48, but may also provide inter-network connectivity—through its connection to the macro base station 34 and, hence, to the operator network 38—to enable the UE 46 to communicate with devices operating in the network 38 (e.g., the UE 36), to access Internet resources (e.g., via the IP network 50), to communicate with wireline phones (e.g., via the circuit switched network 52), etc. The pico base station 32 may facilitate UE's 46 communication with external devices or networks via backhaul connectivity with the macro base station 34 to allow transmission of UE's 46 data to a point (here, the macro base station 34) from where it can be distributed over a network (e.g., the operator network 38) or sent to another major network (e.g., the IP network 50) for further processing. The backhaul communication between the base stations 32, 34 thus allows connectivity for the networks (e.g., the network 48) or base stations (e.g., the pico base station 32) operating at the edge of the macro network (e.g., the network 38). The backhaul communication may include signaling related to handshaking, connection establishment, data transfer, etc. For wireless backhaul technology, considerations such as network capacity, expected or required data speed, relative cost, electromagnetic interference and the availability of radio frequency spectrum space may be taken into account for optimum results. As discussed below, various embodiments of the present invention provide enhanced data transmission capacity with reduced overhead during wireless backhaul communications.

Figure 6:
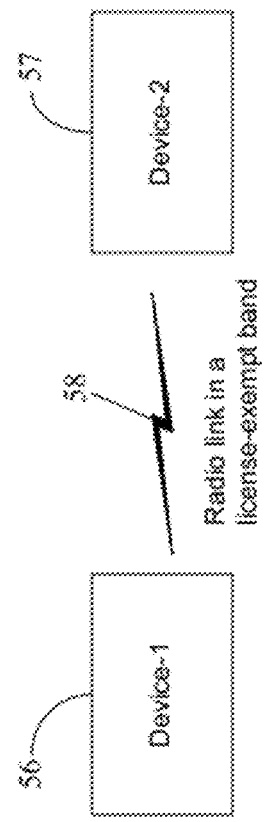
FIG. 6 is an exemplary depiction of communication between two wireless devices in a license-exempt band in which the teachings of one embodiment of the present invention may be implemented.

FIG. 6 is an exemplary depiction of communication between two wireless devices 56-57 in a license-exempt band in which the teachings of one embodiment of the present invention may be implemented. One or both of these devices 56-57 may be Bluetooth devices, walkie-talkie type handsets, or other short-range wireless communication devices (e.g., wireless sensors, cordless phones) that can be connected to each other (e.g., using existing LTE subframes as per the teachings of the present invention) via a radio link 58 in a license-exempt frequency spectrum. In one embodiment, the wireless device 56 may be the UE 46 and the wireless device 57 may be the pico base station 32 operating in a license-exempt frequency band. In one embodiment, such license-exempt frequency band may be the ISM (Industrial, Scientific, and Medical) radio band accommodating license-free error-tolerant communication applications related to wireless sensor networks, wireless Local Area Networks (LANs), cordless phones, etc., operating, for example, in the 2.45 GHz and 5.80 GHz bands. As discussed in more detail below, the teachings of various embodiments of the present invention facilitate fair-sharing of radio links among devices operating in the license-exempt spectrum.

It is noted here that, in the discussion below, the term "transceiver" is primarily used to refer to a device or system having wireless backhaul communication capability or configured to operate in a license-exempt band. Thus, in the present invention, such "transceiver" may include, for example, a communication node such as the macro base station 34, a pico node such as the pico base station 32, a femto node (not shown), a UE (e.g., the UE 46), a mobile/wireless device operating in a license-exempt band (e.g., the device 56, 57), or other appropriate short-range wireless communication device. The teachings of the present invention relate to communication between two such "transceivers" functioning in an operable combination. In the discussion below, the terms "transceiver" and "node" may be occasionally used generally and interchangeably without mentioning specific communication device, base station, or system operable according to the teachings of the present invention. Furthermore, although the pico base station 32 may also function as a communication node in its local network 48, for the sake of clarity, the term "communication node" is primarily used in the discussion herein to refer to the macro base station 34 as can be evident from the context of discussion.

In one embodiment, a transceiver or node (e.g., the macro base station 34, the pico node 32, the devices 56-57, etc., as mentioned above) may be configured (in hardware, via software, or both) to implement the dual-channel based TDD communication as discussed herein. Such configuration may be performed by the manufacturer, network operator, or a user of the transceiver, as applicable. For example, when existing hardware architecture of the communication node 34 cannot be modified, the dual-channel TDD methodology according to one embodiment of the present invention may be implemented through suitable programming (e.g., by the operator of the network 38) of one or more processors (e.g., processor 100 (or, more particularly, processing unit 105) in FIG. 13) in the communication node 34. The execution of the program code (by a processor in the node 34) may cause the processor to provide dual-channel based TDD signaling as discussed herein. Similarly, two short-range wireless communication devices may be programmed (e.g., by their manufacturers) to establish such dual-channel TDD mode of operation between them. In one embodiment, the manufacturer or network operator for the transceiver may set up the dual-channel TDD mode according to the present invention as a default mode of operation in backhaul or license-exempt scenarios. In another embodiment, a user may be allowed to activate or deactivate such dual-channel TDD mode as desired. In a further embodiment, the Core Network (CN) 44 or other network node in the operator network 38 (e.g., the eNB 34) may be configured (in hardware and/or software) to establish dual-channel based TDD communication according to the teachings of the present invention. Various other ways may be conceived to configure the transceivers to implement dual-channel TDD functionality according to the teachings of the present invention. Thus, in the discussion below, although a transceiver or node may be referred to as "performing," "accomplishing," or "carrying out" a function or process, it is evident to one skilled in the art that such performance may be technically accomplished in hardware and/or software as desired.

Figure 7:
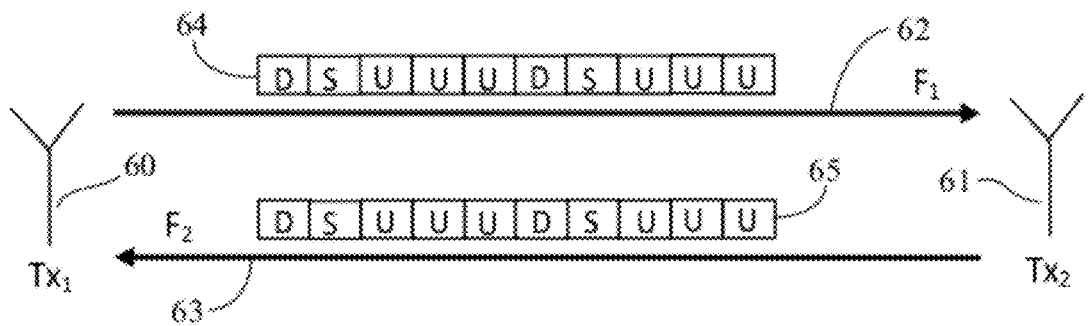
FIG. 7 illustrates a dual channel TDD communication between two transceivers according to one embodiment of the present invention.

FIG. 7 illustrates a dual channel TDD communication between two transceivers 60, 61 (which may be a pico node-macro node pair, a pico node-UE pair, or two devices operating in a license-exempt band, or any other suitable combination of wireless devices/systems as discussed before) according to one embodiment of the present invention. Wireless transmission between two nodes 60, 61 may be set up on two separate carrier frequencies or radio channels 62, 63 with the link for each frequency being set up as a TDD connection. As mentioned before, the nodes 60-61 may be transceivers that are performing wireless backhaul communication or operating in a license-exempt band. In either case, in one embodiment, data transmission is performed on the downlink (DL) subframes (i.e., subframes marked "D" in the radio frames 64, 65) on one carrier and on the uplink (UL) subframes (i.e., subframes marked "U" in the radio frames 64, 65) on the other carrier. Thus, in the context of FIG. 7, the node marked $Tx_2$ (i.e., node 61) sends its data to $Tx_1$ (i.e., node 60) on the uplink subframes (which may be assigned to $Tx_2$ by $Tx_1$) on carrier $F_1$ (i.e., radio channel marked "62") and downlink subframes on carrier $F_2$ (i.e., radio channel marked "63"). On the other hand, data transmissions in the other direction—i.e., from $Tx_1$ to $Tx_2$—happen on the uplink subframes (which may be assigned to $Tx_1$ by $Tx_2$) of carrier $F_2$ and on the downlink subframes of carrier $F_1$. The arrows in FIG. 7 (and also in FIGS. 9-11) indicate direction of downlink subframe-based data transmission. However, it is understood that the arrows are for illustration purpose only. Similarly, each radio frame 64-65 in FIG. 7 (and also in FIGS. 9-11) is shown to have type-0 configuration (from the table 18 in FIG. 2). However, such radio frame configuration is for illustration purpose only. Radio frames could have any other configuration (e.g., from the configurations shown in the table 18 in FIG. 2) as well.

As mentioned here, both downlink and uplink subframes in the radio frame (e.g., any one of the frames 64, 65) may carry data from different transceivers in the same radio frame as per the teachings of the present invention. Also, downlink and uplink subframes in the radio frames 64-65 may carry data from corresponding transceivers simultaneously (e.g., transceiver $Tx_1$ may transmit on a downlink subframe "D" on carrier $F_1$, whereas transceiver $Tx_2$ may simultaneously transmit on a downlink subframe "D" on carrier $F_2$ as can be seen from FIG. 7). However, according to one embodiment of the present invention, any available downlink subframe/slot in a radio frame is used first before using any uplink subframe/slot. In other words, the uplink subframes in each direction may be left unused as far as possible; these UL sub-frames being used to supplement the transceiver-specific downlink subframes only if the amount of data that needs to be sent in a 10 ms radio frame duration (e.g., the duration of the radio frame 64 or 65) cannot be accommodated in the transceiver-specific downlink subframes in the corresponding radio frame (assigned to the transceiver for DL transmissions).

Figure 8:
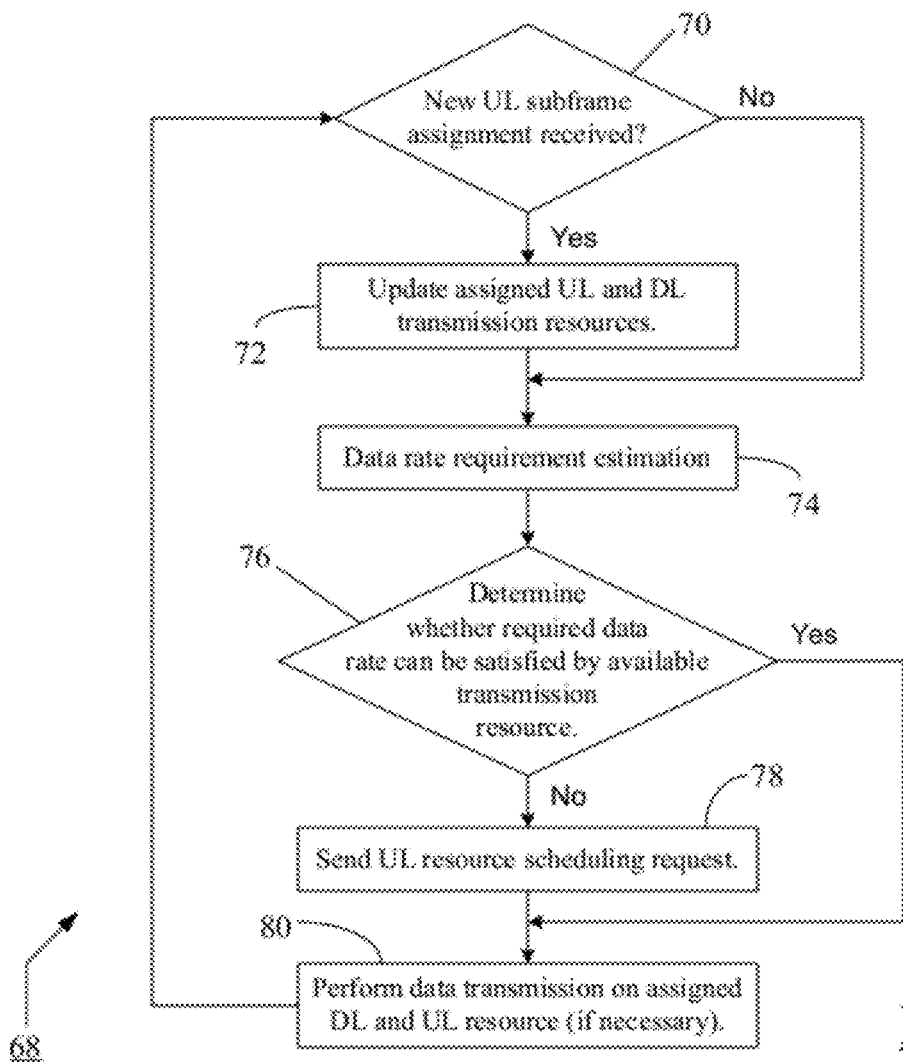
FIG. 8 is an exemplary flowchart depicting operational flow for the dual-channel TDD communication illustrated in FIG. 7.

FIG. 8 is an exemplary flowchart 68 depicting operational flow for the dual-channel TDD communication illustrated in FIG. 7. Initially, at block 70, each node 60, 61 may periodically monitor the DL subframes (from the other node) for UL resource scheduling assignments (from the other node). If DL subframes occur every 5 ms in a radio frame (e.g., as in the radio frames 64-65), the periodicity of such monitoring may be 5 ms. In one embodiment, the periodicity of such monitoring may be equal to 1 ms—i.e., a subframe interval. Alternatively, such monitoring may occur whenever a "D" or a "U" subframe occurs in the selected radio frame configuration (e.g., from the table 18 in FIG. 2). Most of the time, the "D" or "U" subframes may occur every 1 ms and, hence, the periodicity of monitoring may remain close to 1 ms. Referring now to block 72 in FIG. 8, if new UL resource assignments are received at block 70, the node 60, 61 updates total available UL and DL transmission resources. If no new UL transmission resources are received at block 70 or after updating available UL and DL transmission resources at block 72, the node 60, 61 may estimate the data rate requirements at block 74 based on at least queue sizes (e.g., of a buffered queue of data to-be-transmitted) and estimates of data arrival rate (at the receiving node, or from past data arrivals at the transmitting node). At block 76, the node 60, 61 may determine whether the required data rate can be satisfied by the latest available UL and DL transmission resources (i.e., either the currently available UL and DL transmission resources if no updating is performed at block 72, or the updated UL and DL transmission resources at block 72) based on at least the node-specific DL bandwidth and the assigned UL bandwidth. In one embodiment, the DL channel quality estimate, the UL channel quality estimate, and the node's transmission and reception antenna configurations may be used as well. If more transmission resources are needed, the node 60, 61 may send UL resource scheduling request (preferably via one or more node-specific DL subframes on a carrier as discussed with reference to FIG. 7) to the other node (block 78). The scheduling request-related transmission may additionally include buffer size updates (e.g., using a Buffer Status Report (BSR) procedure in LTE) for a node's data buffer (not shown) holding the data to-be-transmitted. Thus, the request to schedule more UL resources could be thus a "routine" UL-scheduling request or could also provide additional details (e.g., via BSR) about "specific" size of the required UL resources.

If the latest transmission resources available at block 76 are sufficient, the node 60, 61 may perform data transmission first on the assigned/available DL resources and then on UL resources (if necessary). Thus, a priority is given to transmissions on the DL as discussed above with reference to FIG. 7. Even when additional UL resource scheduling is requested at block 78, the node 60, 61 may still perform such scheduling-related data transmission and also any partial transmission of pending data using the assigned/available DL and UL resources (block 80) in the DL-first manner mentioned above. The process may then continue at block 70 as shown in FIG. 8.

Figure 9:
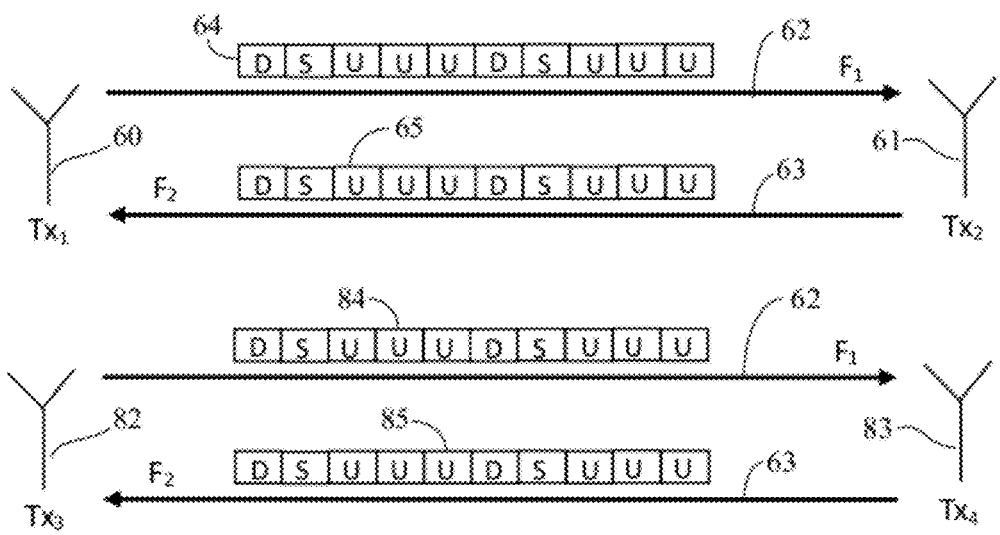
FIG. 9 is similar to FIG. 7 and shows two additional transceivers whose frame timing is synchronized to the radio link between the transceivers in FIG. 7 according to one embodiment of the present invention.

FIG. 9 is similar to FIG. 7 and shows two additional transceivers $Tx_3$ (identified by reference numeral "82") and $Tx_4$ (identified by reference numeral "83") whose frame timing is synchronized to the radio link between the transceivers $Tx_1$ (60) and $Tx_2$ (61) in FIG. 7. Thus, as in case of FIG. 7, in the embodiment of FIG. 9, the radio link between the transceivers 82, 83 also uses carriers frequencies $F_1$ (62) and $F_2$ (63), and the radio frames 84-85 are synchronized with radio frames 64-65 as can be seen from the synchronized occurrences of "D", "S" and "U" subframes in the frames 64, 65, 84, and 85. As in case of nodes $Tx_1$ and $Tx_2$ in FIG. 7, the node $Tx_3$ may send its data to node $Tx_4$ on the DL sub-frames on carrier 62 and on the UL sub-frames (which may be assigned to $Tx_3$ by $Tx_4$) on carrier 63. Similarly, the node $Tx_4$ may send its data to node $Tx_3$ on the DL sub-frames on carrier 63 and on the UL sub-frames (which may be assigned to $Tx_4$ by $Tx_3$) on carrier 62. As in case of the nodes 60-61, the additional nodes 82-83 also perform data transmission first using the corresponding DL sub-frames and leaving the uplink sub-frames in each direction unused as far as possible unless data to be sent in a 10 ms radio frame duration cannot be accommodated in the node-specific DL sub-frames in the corresponding radio frame 84 or 85. It is observed here that although nodes 82-83 are shown to use radio frames of the same type (i.e., type-0 or "DSUUUDSUUU" frame structure in this case) as in case of nodes 60-61, in one embodiment, the nodes 82-83 may use a radio frame having a frame structure different from that used for communication between nodes 60-61.

Thus, it is seen from the discussion above with reference to FIGS. 7-9 that, when data transmissions are not necessary or are required only at a low rate, there is no power emitted on the radio link (between two transceivers using dual-channel TDD according to one embodiment of the present invention) during the uplink (or "U") subframes because of the priority given to transmissions on the DL (or "D" subframes). This results in the radio link remaining transmission-free in low-load conditions for more than 6 subframes out of 10 sub-frames in a radio frame (e.g., any of the radio frames 64, 65, 84, 85) because parts of the special subframes (marked with letter "5") containing UpPTS fields also are transmission-free. To further limit power emissions, a transceiver can be configured to allow UL resource scheduling requests only in the UpPTS field of the "S" subframe (thereby preventing use of "D" or "U" subframes) or only on one of the regular "U" subframes per UL/DL period (which period can be 5 ms in the frame configurations of FIGS. 7 and 9 and may refer to the period when the whole frame configuration repeats).

For wireless backhaul applications, the dual-channel based TDD communication according to one embodiment of the present invention results in a more benign interference environment. In the embodiment shown in FIG. 9, the frame timing is synchronized for all radio links in the system (containing the transceivers 60-61 and 82-83) so that the system has low interference during the uplink subframes (because, as mentioned before, in an LTE uplink subframe reference symbols are only transmitted when there is data to be sent), resulting in a high signal to impairment ratio that can enable high data rate communication for other links (not shown) transmitting during the same time period as the uplink subframes. For the license-exempt use of LTE, the invention results in radio-silence during the uplink subframes when there is no transmission. This potentially allows other unlicensed devices to operate within this time period. In one embodiment, the LTE-based transceivers (e.g., nodes 60, 61, 82, 83) may decide to selectively schedule transmission on certain subframes or not, so as to enable fair sharing of radio channel resources with other devices (e.g., like devices 56-57) in the license-exempt spectrum.

Figure 10:
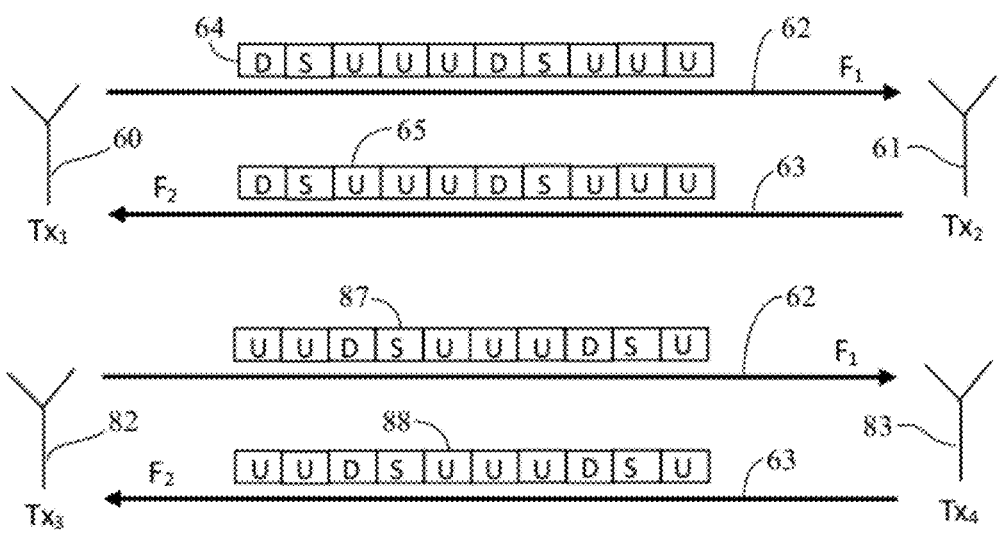
FIG. 10 shows an exemplary LTE-based dual-channel TDD communication according to one embodiment of the present invention with asynchronous links between two pairs of transceivers.

FIG. 10 shows an exemplary LTE-based dual-channel TDD communication according to one embodiment of the present invention with asynchronous links between two pairs of transceivers 60-61 and 82-83. It is observed here that while cellular TDD systems for communication between nodes with asymmetric transmit powers—such as a radio base station (e.g., the eNodeB 34 in FIG. 5) and a user equipment (e.g., UE 36 in FIG. 5)—are typically synchronized so that the frame timing for all nodes in the system is aligned, this may not be necessary in the wireless backhaul application where transmit powers from both nodes involved in a typical point to point link might be substantially equal. Hence, in the embodiment of FIG. 10, the frame timing for each backhaul link (between a pair of transceivers) could be randomized so that the effect of the transmission-free periods on the uplink subframes could result in a lower overall average interference level in the system. Thus, in FIG. 10, the timing of radio frames 87-88 on a radio link between nodes 82-83 is asynchronous with the timing of corresponding radio frames 64-65 on the radio link between nodes 60-61. in FIG. 10, the "UUDSUUUDSU" sub-frame sequence in frames 87-88 are asynchronous with "DSUUUDSUUU" sub-frame sequence in simultaneously-occurring frames 64-65. Note that while FIG. 10 shows asynchronous frame timings between the links for two different transceiver pairs, the links on carriers $F_1$ (62) and $F_2$ (63) for a single transceiver pair (e.g., the transceivers 60-61) may be asynchronous as well. Asynchronous operation of this sort may be possible for the backhaul application, but may not be desirable for the license-exempt use of LTE (e.g., to avoid conflicts or interference when other devices operating in the license-exempt band may need to operate without interference). Furthermore, in one embodiment, even when the frame timings are synchronized, the link on carrier $F_1$ (62) between a transceiver pair (e.g., nodes 60-61) may carry a radio frame having a sub-frame configuration (e.g., from the configurations shown in table 18 in FIG. 2) that is different from the sub-frame configuration of the second radio frame on the link on carrier $F_2$ (63) between transceivers 60-61.

Figure 11:
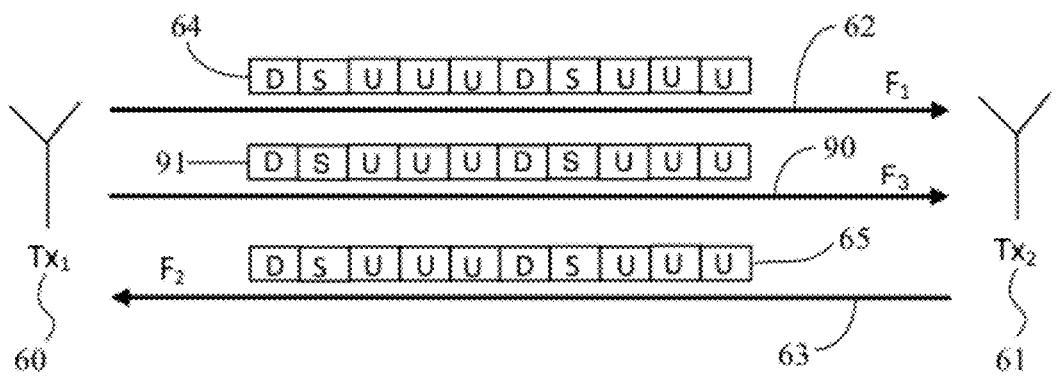
FIG. 11 illustrates an exemplary LTE-based multi-channel TDD communication between two transceivers according to one embodiment of the present invention.

FIG. 11 illustrates an exemplary LTE-based multi-channel TDD communication between two transceivers 60-61 according to one embodiment of the present invention. In FIG. 11, more than one carrier (i.e., carriers $F_1$ (62) and $F_3$ (90)) is employed in at least one of the links between the pair of nodes 60-61. The additional carrier $F_3$ (90) may carry a radio frame 91 having the same sub-frame configuration ("DSUUUDSUUU") as that for other two radio frames 64-65 and synchronized with the other two radio frames 64-65. The overall operation flow as shown in FIG. 8 can be followed in the multi-channel communication scenario in FIG. 11 as well. Thus, for example, in FIG. 11, node 60 may send data to node 61 on downlink subframes on carriers $F_1$ and $F_3$ and on uplink subframes on carrier $F_2$, whereas node 61 may send data to node 60 on downlink subframes on carrier $F_2$ and uplink subframes on carriers $F_1$ and $F_3$. As discussed before, the uplink subframes may be left unused as far as possible, and may be used only if the amount of data that needs to be sent in a 10 ms radio frame duration cannot be accommodated in the transceiver-specific downlink subframes. In the communication scheme of FIG. 11, a node (e.g., transceiver 60 or 61) has the additional flexibility of requesting resource scheduling for more than one carrier. A node with the necessary DL and UL resource assignments can also transmit on more than one carrier simultaneously.

Thus, it is seen from discussion of FIGS. 7-11 that LTE's TDD mode-based signaling may be used in a modified manner (e.g., by establishing priority between downlink and uplink transmissions as discussed herein) to facilitate dual-channel (or multi-channel) TDD communication between two transceivers performing wireless backhaul or operating in a license-exempt band. As mentioned before, because of similarity between LTE and WiMAX TDD frame structures, the foregoing embodiments may be suitably implemented using WiMAX-based TDD frame structures as well. Furthermore, although the teachings of the present invention are described primarily in the context of LTE and WiMAX standards, the teachings may be conveniently adapted to any other synchronized (or framed) TDD-based communication system. The teachings of the present invention also may be applied, with suitable modifications (as may be apparent to one skilled in the art using the present teachings), to other wireless systems or networks as well, such as, for example, networks/systems using 3G/4G specifications.

It is noted here that although the foregoing discussion focused on giving priority to DL transmissions while leaving UL sub-frames empty as long as possible, in other embodiments, data may be sent between two transceivers only in the uplink subframes with the downlink subframes being left empty. For the sake of brevity, this uplink-preferred arrangement is not discussed at length herein, however the discussion herein may be conveniently used to implement such an arrangement as well.

The dual-channel based TDD communication using downlink (or uplink) subframe-selective transmissions according to the teachings of the present invention thus uses existing LTE/WiMAX implementations of TDD (e.g., the downlink and uplink implementations shown in FIGS. 1-4 for an LTE TDD radio frame) to minimize interference when data is not being transmitted (e.g., by avoiding transmission of empty or data-less downlink subframes), thus improving system performance for applications such as wireless backhaul. When downlink subframes are preferred for data transmission, the issue of transmission of reference symbols and pilot/synchronization sequences in empty LTE downlink subframes without accompanying data may not arise. Furthermore, when data is not transmitted using uplink subframes, the reference symbols in LTE uplink subframes are not sent as well, thereby significantly reducing interference and unnecessary transmissions in the system. In certain embodiments of the present invention, the use of existing LTE (or WiMAX) implementations of TDD radio frames to achieve radio silence for some duration (e.g., when no uplink sub-frames are transmitted) when operating in a license-exempt spectrum allows other license-exempt devices to potentially share the radio channel during the silence period.

Figure 12:
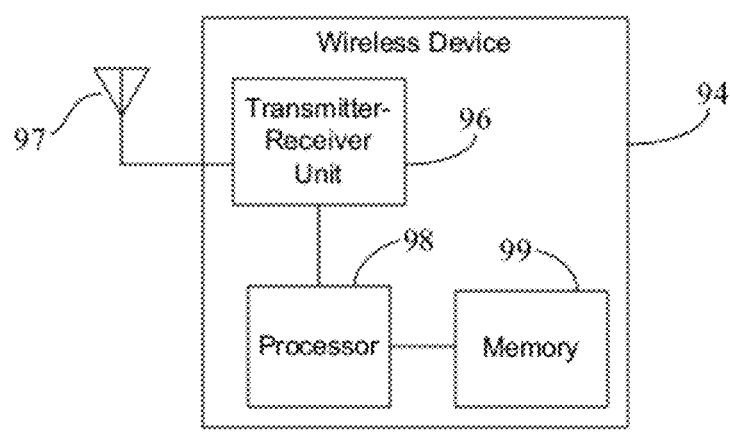
FIG. 12 is a block diagram of an exemplary wireless device or transceiver according to one embodiment of the present invention.

FIG. 12 is a block diagram of an exemplary wireless device or transceiver 94 according to one embodiment of the present invention. The transceiver 94 may represent the devices 56, 57 in FIG. 6, and may also provide a simpler representation of the pico base station 32. The wireless device 94 may include a transmitter/receiver unit 96, an antenna 97, a processor 98, and a memory 99 (which may, in some embodiments, also include any buffer memory or data buffer storing data to be transmitted via DL and UL subframes). In particular embodiments, some or all of the functionalities described above (e.g., setting up a dual-channel TDD connection with a wireless device via transmitter/receiver unit 96 and antenna 97, selective transmission of data in memory 99 giving preference to DL subframes, assignment of UL subframes, etc.) as being provided by transceivers or nodes in FIGS. 7-11 may be provided by the processor 98 executing instructions stored on a computer-readable medium, such as the memory 99 shown in FIG. 12. For example, the processor 98 may cause the transmitter/receiver unit 96 to set-up the dual-channel TDD connection, or to carry out DL-subframe based selective transmission, etc. Alternative embodiments of the wireless device 94 may include additional components beyond those shown in FIG. 12 (e.g., an interface unit to provide interface with the macro base station 34 when the wireless device 94 represents the pico base station 32) that may be responsible for providing certain aspects of the device's 94 functionality, including any of the functionality described above and/or any functionality necessary to support the dual (or multiple) channel based TDD solution described above.

Figure 13:
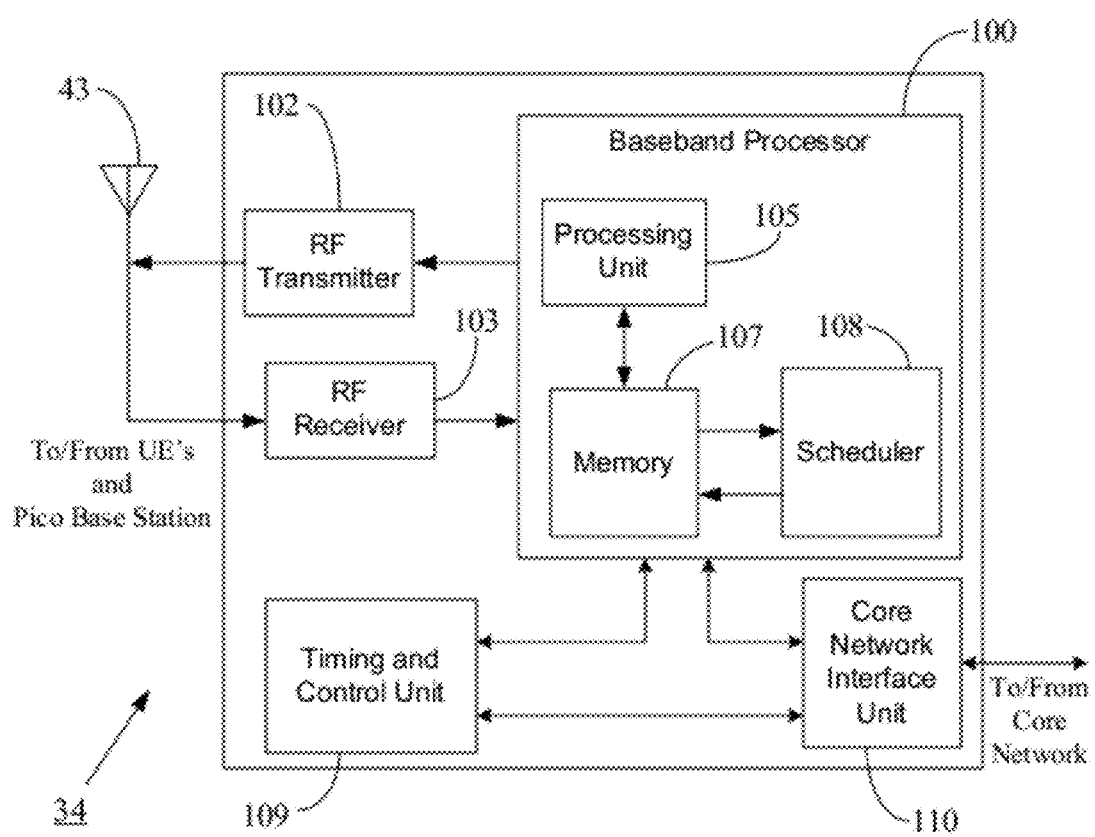
FIG. 13 is a block diagram of an exemplary macro base station or a similar mobile communication node (or eNodeB) according to one embodiment of the present invention.

FIG. 13 is a block diagram of an exemplary macro base station 34 or a similar mobile communication node (or eNodeB) according to one embodiment of the present invention. The macro base station or eNodeB 34 may include a baseband processor 100 to provide radio interface with the mobile handsets 36 (in the operator network 38) and pico base station 32 via the eNodeB's Radio Frequency (RF) transmitter 102 and RF receiver 103 units coupled to the eNodeB antenna 43. The processor 100 may be configured (in hardware and/or software) to provide cellular connectivity to the UE's 36, 46 and to also provide dual- or multi-channel based TDD backhaul communication to the pico (or femto) base station 32 as per the teachings of the present invention. In one embodiment, the processor 100 may also receive various intimations from the pico (or other smaller) base station 32 (e.g., request to establish a dual- or multi-channel TDD connection for wireless backhaul, data transmissions via DL and UL subframes according to the teachings of the present invention, data transmissions from the UE 46, etc.) and the UE 36 via the receiver 103, whereas macro base station's 34 transmissions to the UE 36 and the pico base station 32 (e.g., request to establish a dual- or multi-channel TDD connection, wireless backhaul related data transmissions to the pico base station 32 using the teachings of the present invention, etc.) may be carried out via the transmitter 102. The baseband processor 100 may include a processing unit 105 in communication with a memory 107 to process and store relevant information (including information related to backhaul communication with pico base station 32) for the network cell in which the eNodeB 34 operates. A scheduler (e.g., the scheduler 108 in FIG. 13) in the eNodeB 34 may provide the scheduling decisions for UE 36 and pico base station 32 based on a number of factors such as, for example, QoS (Quality of Service) parameters, UE or pico base station's buffer status, uplink channel quality report received from UE 36 or pico base station 32, UE or pico base station capabilities, etc. The scheduler 108 may have the same data structure as a typical scheduler in an eNodeB in an LTE system.

The processor 100 may also provide additional baseband signal processing (e.g., mobile device registration, channel signal information transmission, radio resource management, etc.) as required. The processing unit 105 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B (eNodeB), an HeNB, a Home Node B (HNB), a home base station, a femtocell base station, and/or any other type of mobile communication node may be provided by the processing unit 105 executing instructions stored on a computer-readable data storage medium, such as the memory 107 shown in FIG. 13.

The macro base station 34 may further include a timing and control unit 109 and a core network interface unit 110 as illustrated in FIG. 13. The control unit 109 may monitor operations of the processor 100 and the network interface unit 110, and may provide appropriate timing and control signals to these units. The interface unit 110 may provide a bi-directional interface for the base station 34 to communicate with the core network 44 to facilitate administrative and call-management functions for mobile subscribers (e.g., UE 36) operating in the operator network 38 through eNodeB 34 or other mobile subscribers (e.g., UE 46) linked to the operator network 38 via a secondary network (e.g., local network 48).

Alternative embodiments of the base station 34 may include additional components responsible for providing additional functionality, including any of the functionality identified above and/or any functionality necessary to support the dual- or multi-channel TDD solution described above. Although features and elements are described above in particular combinations, each feature or element can be used alone without the other features and elements or in various combinations with or without other features and elements. The methodology provided herein (related to dual- or multi-channel communication using existing LTE TDD frames) may be implemented in a computer program, software, or firmware incorporated in a computer-readable storage medium (e.g., the memory 107 in FIG. 13 and memory 99 in FIG. 12) for execution by a general purpose computer or a processor (e.g., the processor 98 in FIG. 12 and processing unit 105 in FIG. 13). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method to use existing LTE and WiMAX based signaling to effectuate dual-channel TDD communication between two transceivers giving preference to one type of subframes (either downlink or uplink) for data transmission. In backhaul communications between pico (or femto) and macro base stations, using LTE and WiMAX's TDD mode in such a manner effectively reduces unnecessary transmissions of pilot and synchronization sequence in downlink signaling, thereby reducing the level of pilot overhead and minimizing interference when data is not being transmitted. Similarly, the use of existing LTE (or WiMAX) implementations of TDD radio frames in this manner may achieve radio silence for some duration (e.g., when no uplink sub-frames are transmitted) when operating in a license-exempt spectrum, thereby allowing other license-exempt devices to potentially share the radio channel during the silence period.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of wirelessly transmitting data between a first transceiver and a second transceiver, the method comprising:
   establishing a first Time Division Duplex (TDD) connection between the first and second transceivers on a first carrier frequency;
   establishing a second TDD connection between the first and second transceivers on a second carrier frequency;
   selecting by the first transceiver, subframes for transmitting the data to the second transceiver during a single radio frame duration, wherein the subframes are selected from:
      a first set of subframes in the first TDD connection, wherein the first set of subframes is designated for downlink transmission in the first TDD connection, and
      a second set of subframes in the second TDD connection, wherein the second set of subframes is designated for uplink transmission in the second TDD connection;
   transmitting the data from the first transceiver to the second transceiver utilizing the subframes selected from both the first and second sets of subframes;
   selecting by the second transceiver, subframes from at least one set of subframes for transmitting the data to the first transceiver during a single radio frame duration, wherein the subframes are selected by the second transceiver from:
      a third set of subframes in the first TDD connection, wherein the third set of subframes is designated for uplink transmission in the first TDD connection, and
      a fourth set of subframes in the second TDD connection, wherein the fourth set of subframes is designated for downlink transmission in the second TDD connection; and
   transmitting the data from the second transceiver to the first transceiver utilizing the selected subframes;
   wherein the method further comprises at least one of the following:
   setting up a third TDD connection between a third transceiver and a fourth transceiver on the first carrier frequency, wherein uplink and downlink subframes in the third TDD connection are synchronized with corresponding subframes in the third and the first sets of subframes in the first TDD connection during the single radio frame duration; and
   setting up a fourth TDD connection between the third and the fourth transceivers on the second carrier frequency, wherein uplink and downlink subframes in the fourth TDD connection are synchronized with corresponding subframes in the second and the fourth sets of subframes in the second TDD connection during the single radio frame duration.

2. A method of wirelessly transmitting data between a first transceiver and a second transceiver, the method comprising:
   establishing a first Time Division Duplex (TDD) connection between the first and second transceivers on a first carrier frequency;
   establishing a second TDD connection between the first and second transceivers on a second carrier frequency;
   selecting by the first transceiver, subframes for transmitting the data to the second transceiver during a single radio frame duration, wherein the subframes are selected from:
      a first set of subframes in the first TDD connection, wherein the first set of subframes is designated for downlink transmission in the first TDD connection, and
      a second set of subframes in the second TDD connection, wherein the second set of subframes is designated for uplink transmission in the second TDD connection;
   transmitting the data from the first transceiver to the second transceiver utilizing the subframes selected from both the first and second sets of subframes;
   selecting by the second transceiver, subframes from at least one set of subframes for transmitting the data to the first transceiver during a single radio frame duration, wherein the subframes are selected by the second transceiver from:
      a third set of subframes in the first TDD connection, wherein the third set of subframes is designated for uplink transmission in the first TDD connection, and
      a fourth set of subframes in the second TDD connection, wherein the fourth set of subframes is designated for downlink transmission in the second TDD connection; and
   transmitting the data from the second transceiver to the first transceiver utilizing the selected subframes;
   wherein the method further comprises at least one of the following:
   setting up a third TDD connection between a third transceiver and a fourth transceiver on the first carrier frequency, wherein uplink and downlink subframes in the third TDD connection are asynchronous with corresponding subframes in the third and the first sets of subframes in the first TDD connection during the single radio frame duration; and setting up a fourth TDD connection between the third and the fourth transceivers on the second carrier frequency, wherein uplink and downlink subframes in the fourth TDD connection are asynchronous with corresponding subframes in the second and the fourth sets of subframes in the second TDD connection during the single radio frame duration.

3. A method of wirelessly transmitting data between a first transceiver and a second transceiver, the method comprising:

establishing a first Time Division Duplex (TDD) connection between the first and second transceivers on a first carrier frequency;

establishing a second TDD connection between the first and second transceivers on a second carrier frequency;

selecting by the first transceiver, subframes for transmitting the data to the second transceiver during a single radio frame duration, wherein the subframes are selected from:
  a first set of subframes in the first TDD connection, wherein the first set of subframes is designated for downlink transmission in the first TDD connection, and
  a second set of subframes in the second TDD connection, wherein the second set of subframes is designated for uplink transmission in the second TDD connection;

transmitting the data from the first transceiver to the second transceiver utilizing the subframes selected from both the first and second sets of subframes;

selecting by the second transceiver, subframes from at least one set of subframes for transmitting the data to the first transceiver during a single radio frame duration, wherein the subframes are selected by the second transceiver from:
  a third set of subframes in the first TDD connection, wherein the third set of subframes is designated for uplink transmission in the first TDD connection, and
  a fourth set of subframes in the second TDD connection, wherein the fourth set of subframes is designated for downlink transmission in the second TDD connection;

transmitting the data from the second transceiver to the first transceiver utilizing the selected subframes;

using a third transceiver, transmitting data to a fourth transceiver using a fifth set of subframes in a third TDD connection established between the third and the fourth transceivers on the first carrier frequency, wherein the subframes in the fifth set of subframes are designated for downlink transmission in the third TDD connection; and using the third transceiver, transmitting data to the fourth transceiver using a sixth set of subframes in a fourth TDD connection established between the third and the fourth transceivers on the second carrier frequency, wherein the subframes in the sixth set of subframes are designated for uplink transmission in the fourth TDD connection, wherein one of the following applies:
  the third transceiver transmits data to the fourth transceiver using the subframes in the sixth set of subframes during the single radio frame duration only when the subframes in the fifth set of subframes during the single radio frame duration are insufficient to accommodate data to be sent from the third transceiver during the single radio frame duration, and
  the third transceiver transmits data to the fourth transceiver using the subframes in the fifth set of subframes during the single radio frame duration only when the subframes in the sixth set of subframes during the single radio frame duration are insufficient to accommodate data to be sent from the third transceiver during the single radio frame duration.

4. The method of claim 3, further comprising:

using the fourth transceiver, performing one of the following:
  transmitting data to the third transceiver using a seventh set of subframes in the third TDD connection and an eighth set of subframes in the fourth TDD connection, wherein the subframes in the seventh set of subframes are designated for uplink transmission in the third TDD connection and the subframes in the eighth set of subframes are designated for downlink transmission in the fourth TDD connection, wherein the subframes in the seventh set of subframes are used for data transmission during the single radio frame duration only when the subframes in the eighth set of subframes during the single radio frame duration are insufficient to accommodate data to be sent from the fourth transceiver during the single radio frame duration; and
  transmitting data to the third transceiver using the seventh set of subframes in the third TDD connection and the eighth set of subframes in the fourth TDD connection, wherein the subframes in the eighth set of subframes are used for data transmission during the single radio frame duration only when the subframes in the seventh set of subframes during the single radio frame duration are insufficient to accommodate data to be sent from the fourth transceiver during the single radio frame duration.

5. A method of wirelessly transmitting data between a first transceiver and a second transceiver, the method comprising:

establishing a first Time Division Duplex (TDD) connection between the first and second transceivers on a first carrier frequency;

establishing a second TDD connection between the first and second transceivers on a second carrier frequency;

selecting by the first transceiver, subframes for transmitting the data to the second transceiver during a single radio frame duration, wherein the subframes are selected from:
  a first set of subframes in the first TDD connection, wherein the first set of subframes is designated for downlink transmission in the first TDD connection, and
  a second set of subframes in the second TDD connection, wherein the second set of subframes is designated for uplink transmission in the second TDD connection;

transmitting the data from the first transceiver to the second transceiver utilizing the subframes selected from both the first and second sets of subframes;

selecting by the second transceiver, subframes from at least one set of subframes for transmitting the data to the first transceiver during a single radio frame duration, wherein the subframes are selected by the second transceiver from:
  a third set of subframes in the first TDD connection, wherein the third set of subframes is designated for uplink transmission in the first TDD connection, and a fourth set of subframes in the second TDD connection, wherein the fourth set of subframes is designated for downlink transmission in the second TDD connection;

transmitting the data from the second transceiver to the first transceiver utilizing the selected subframes;

setting up a third TDD connection between the first and the second transceivers on a third carrier frequency that is different from the first and the second carrier frequencies; and performing one of the following:

configuring the first transceiver to send data to the second transceiver using the first set of subframes in the first TDD connection, the second set of subframes in the second TDD connection, and a fifth set of subframes in the third TDD connection, and configuring the second transceiver to send data to the first transceiver using the third set of subframes in the first TDD connection, the fourth set of subframes in the second TDD connection, and a sixth set of subframes in the third TDD connection, wherein subframes in the fifth set of subframes are designated for downlink transmission in the third TDD connection and subframes in the sixth set of subframes are designated for uplink transmission in the third TDD connection, and configuring the second transceiver to send data to the first transceiver using the fourth set of subframes in the second TDD connection, the fifth set of subframes in the third TDD connection, and the third set of subframes in the first TDD connection, and configuring the first transceiver to send data to the second transceiver using the first set of subframes in the first TDD connection, the second set of subframes in the second TDD connection, and the sixth set of subframes in the third TDD connection.

* * * * *

UNITED STATES PATENT AND TRADEMARK OFFICE
CERTIFICATE OF CORRECTION

| | |
|---|---|
| PATENT NO. | : 8,654,687 B2 |
| APPLICATION NO. | : 13/109524 |
| DATED | : February 18, 2014 |
| INVENTOR(S) | : Koorapaty et al. |

It is certified that error appears in the above-identified patent and that said Letters Patent is hereby corrected as shown below:

In the Specification:

In Column 11, Lines 18-19, delete "(marked with letter "5")" and insert -- (marked with letter "S") --, therefor.

In Column 11, Line 67, delete "nodes 60-61. in" and insert -- nodes 60-61. In --, therefor.

In the Claims:

In Column 17, Line 18, in Claim 3, delete "selectins" and insert -- selecting --, therefor.

Signed and Sealed this
Fifteenth Day of July, 2014

Michelle K. Lee
*Deputy Director of the United States Patent and Trademark Office*